United States Patent Office 3,539,561
Patented Nov. 10, 1970

3,539,561
PHOSPHINOTHIOIC AMIDES
Paul B. Budde and Henry Tolkmith, Midland, Mich., assignors to The Dow Chemical Company, Midland, Mich., a corporation of Delaware
No Drawing. Application Jan. 5, 1966, Ser. No. 518,788, now Patent No. 3,433,798, dated Mar. 18, 1969, which is a continuation-in-part of application Ser. No. 451,983, Apr. 29, 1965, now Patent No. 3,323,990. Divided and this application Sept. 23, 1968, Ser. No. 761,813
Int. Cl. C07d 49/36
U.S. Cl. 260—240
5 Claims

ABSTRACT OF THE DISCLOSURE

Novel imidazolyl phosphorus compounds, useful for the control of fungi, having the formula

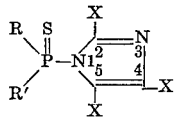

wherein each X substituent independently represents hydrogen, loweralkyl or phenyl, the total number of carbon atoms in all X substituents being an integer of from 0 to 15, both inclusive; and, each of R and R' being taken separately, R represents diloweralkylamido, heteroparaffinic amido, heteroaromatic amido and

G being a member selected from the group consisting of loweralkyl and G''; G' being a member selected from the group consisting of phenyl, loweralkylphenyl and G''; and G'' being a member selected from the group consisting of phenylloweralkyl, (loweralkylphenyl)loweralkyl, furfuryl, tetrahydrofurfuryl and (4-pyridylmethyl); and each R' independently represents phenyl or styryl.

CROSS-REFERENCE TO RELATED APPLICATIONS

This application is a division of our copending application, Ser. No. 518,788, filed Jan. 5, 1966, now U.S. Pat. 3,433,798, which in turn is a continuation-in-part of application, Ser. No. 451,983, filed Apr. 29, 1965, now U.S. Pat. 3,323,990.

SUMMARY OF THE INVENTION

The present invention is concerned with imidazolyl phosphorus compounds of the formula:

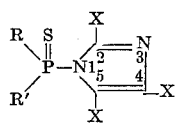

In the above and succeeding formulae, each X substituent independently represents a member selected from the group consisting of hydrogen, loweralkyl and phenyl, the total number of carbon atoms in all X substituents being an integer of from 0 to 15, both inclusive; and (A) each of R and R' being taken separately, R represents a member selected from the group consisting of diloweralkylamido and R' and each R' independently represents a member selected from the group consisting of
(1) phenyl,
(2) styryl,
(3) heteroparaffinic amido,
(4) heteroaromatic amido, and
(5)

G being a member selected from the group consisting of loweralkyl and G''; G' being a member selected from the group consisting of phenyl, loweralkylphenyl and G''; and G'' being a member selected from the group consisting of phenylloweralkyl, (loweralkylphenyl)loweralkyl, furfuryl, tetrahydrofurfuryl and (4-pyridylmethyl); and (B) R and R' being taken together, R and R' jointly represents a moiety of the formula

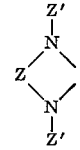

Z being a member selected from the group consisting of o-phenylene and alkylene being of from 2 to 3, both inclusive, carbon atoms; and each Z' independently being a member selected from the group consisting of loweralkyl, phenyl and phenylloweralkyl.

In the present specification and claims, the terms "imidazolyl phosphorus compound" and "imidazolyl phosphorus compounds" are employed to designate only a compound or compounds of this formula hereinabove. The unmodified term "imidazolyl" is employed to refer only to a moiety of the formula:

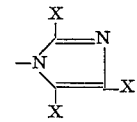

The novel products of the present invention are liquids or crystalline solid materials which are somewhat soluble in many common organic solvents and of very low solubility in water. They exhibit the advantageous and highly desirable combination of high fungitoxicity and low mammalian toxicity and are therefore very useful in the control of fungal organisms.

In the definitions in the present specification and claims of G' as being loweralkylphenyl and of G'' as being phenylloweralkyl or (loweralkylphenyl)loweralkyl, any such radical has a total number of carbon atoms which is an integer of from 7 to 15, both inclusive. In the instance of the loweralkylphenyl and (loweralkylphenyl)-loweralkyl radicals, one or two loweralkyl substitutents are present on the phenyl moiety of the radical. The term "diloweralkylamido" is employed in the present specification and claims to designate a radical of the formula

wherein each E independently represents a loweralkyl radical being of from 1 to 4, both inclusive, carbon atoms. The term "heteroaparaffinic amido" is employed in the present specification and claims to described a radical selected from the group consisting of morpholino, thiomorpholino, piperidino, 1-pyrrolidinyl, 4-substituted-1-piperazinyl wherein the substituent is loweralkyl, phenyl or acetyl and 1,2,3,6-tetrahydro-1-pyridyl; and the term "heteroaromatic amido" to describe a radical of the formula

wherein Q represents a group which, with the nitrogen atom, completes an aromatic ring which (a) has five ring atoms, of which ring atoms at least two are nitrogen and one is carbon, each of the two remaining ring atoms being selected from the group consisting of carbon and nitrogen and of which (b) each ring carbon atom bears a substituent which is selected from the group consisting of hydrogen, loweralkyl and phenyl, the total number of carbon atoms in all substituents on all ring carbon atoms of the aromatic ring being an integer from 0 to 15, both inclusive.

Representative heteroaromatic amido radicals include the following: pyrazol-1-yl, imidazol-1-yl, 1,2,3-triazol-1-yl, 3,5-di - n - propylpyrazol-1-yl, 3-n-butylpyrazol-1-yl, 4,5-diphenylpyrazol-1-yl, 2-methylimidazol-1-yl, 2-sec-butylimidazol-1-yl, 2-phenylimidazol-1-yl, 2-methyl-4-phenylimidazol-1-yl; 2-phenyl - 4 - methylimidazol-1-yl, 4,5-diphenylimidazol-1-yl, 4,5-di-n-butylimidazoyl-1-yl, 2-methyl-4,5-di-n-propylimidazoyl-1-yl, 2-ethylimidazol-1-yl, 3,5-dimethyl-1,2,4-triazol-1-yl, 3,5-diphenyl-1,2,4-triazol-1-yl, 4-tert-butyl-1,2,3-triazol-1-yl, 5 - isopropyltetrazol-1-yl, 5-isobutyltetrazol-1-yl and 5-phenyltetrazol-1-yl.

The products of the present invention are prepared by reacting a phosphorothioic chloride compound of the formula

with an imidazole compound of the formula:

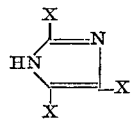

The reaction is conveniently carried out in the presence of an inert liquid reaction medium which is preferably an organic liquid, and in the presence of a hydrogen chloride acceptor. The imidazole compound can be employed both as reactant and as hydrogen chloride acceptor, or any tertiary organic amine such as triethylamine can be employed as hydrogen chloride acceptor. The reaction takes place smoothly at temperatures between 0° and 60° C., and preferably at temperatures between 25° and 60°, with the production of the desired imidazolyl phosphorus compound and by-product which appears as the hydrochloride salt of the compound employed as hydrogen chloride acceptor.

Organic liquids which are suitable as reaction media include hydrocarbons such as benzene, toluene, xylene and cyclohexane; ethers such as diethyl ether, 1,2-dimethoxyethane or tetrahydrofuran; and tertiary amines such as triethylamine. It is generally preferred to avoid the use as reaction medium of any compound which has a reactive hydrogen because its use may result in side reactions.

The amounts of the reactants to be employed are not critical, some of the desired product compound being obtained when employing the reactants in any amounts. However, the reaction consumes the reactants in amounts representing equimolecular proportions of phosphorothioic chloride, imidazole compound and hydrogen chloride acceptor, and the use of amounts which represent such proportions is preferred. When imidazole compound is employed both as reactant and as hydrogen chloride acceptor, the reaction consumes one molecular proportion of phosphorothioic chloride and two molecular proportions of imidazole compound, and the use of the reactants in amounts representing such proportions is preferred.

In carrying out the reaction, the reactants are contacted together in any convenient fashion and maintained for a period of time in the reaction temperature range. Some of the desired product is formed immediately upon the contacting together of the reactants; however, the yield of the desired product is increased by permitting the reaction mixture to stand for a period of time, preferably with stirring or other mechanical agitation of the mixture. Following the completion of the reaction, the reaction mixture can be employed for the useful purposes of the present invention. However, the desired product compound can be separated from the reaction mixture. In many instances, for example, where the product compound is to be employed for the control of fungal organisms attacking foliage and a phytotoxic compound has been employed as reaction medium, separation is preferable. The separation is carried out in conventional procedures. Most typically, the reaction mixture is filtered to separate the insoluble hydrochloride by-product salt, and organic liquid employed as reaction mixture is removed from the filtrate by evaporation under subatmospheric pressure to separate the desired product. The product so obtained can be used without purification or can be purified by conventional procedures. For example, the separated product can be mixed with a quantity of any of the organic liquids to be employed as reaction medium, the resulting mixture filtered to separate insoluble by-product materials and the organic liquid removed from the filtered mixture by evaporation under subatmospheric pressure to obtain the purified product. Also, in the instance of those products which are solids, the separated product can be purified by recrystallization.

The imidazolyl phosphorus compounds can also be prepared in alternative procedures. One of these is suitable for all products wherein not more than one of R and R' represents phenyl or styryl. In this procedure, a phosphorothioic dichloride compound having one of the formulae

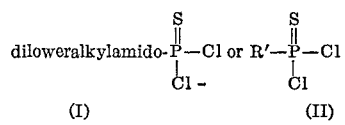

is reacted in the presence of a hydrogen chloride acceptor with an imidazole compound, as previously defined, to form an intermediate imidazolyl phosphorothioic chloride compound of one of the corresponding formulae:

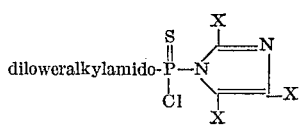

or

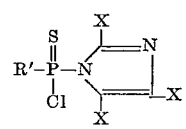

This intermediate is thereafter reacted in the presence of a hydrogen chloride acceptor with an amino compound to obtain the desired imidazolyl phosphorus compound. In the instance of the compound of Formula Ia, the amino compound is a reactant of the formula H—R″ wherein R″ is heteroparaffinic amido, heteroaromatic amido or

In the instance of the compound of Formula IIa, the amino compound is a reactant of one of the formulae H—R″ and diloweralkylamido-H.

The reactions of this first alternative procedure are conveniently carried out in a reaction medium of the sort employed in the preparation procedure previously described. The hydrogen chloride acceptor employed in either reaction of the procedure can be an organic tertiary amine; preferably, however, the imidazole compound or amino compound, respectively, is employed both as reactant and as hydrogen chloride acceptor. Good results are obtained when employing substantially equimolecular proportions of (1) phosphorothioic dichloride compound, imidazole compound and hydrogen chloride acceptor, and (2) intermediate, amino compound and hydrogen chloride acceptor. When imidazole compound and amino compound are employed both as reactant and as hydrogen chloride acceptor, good results are obtained when employing (1) one molecular proportion of phosphorothioic dichloride compound and two molecular proportions of imidazole compound, and (2) one molecular proportion of intermediate and two molecular proportions of amino compound. The first step of the reaction is somewhat exothermic and is carried out at temperatures of from −50° to 25° C. The second step of the reaction is also exothermic and takes place at temperatures of from −10° to 60° C. The temperature can be controlled by regulating the rate of mixing and contacting of the reactants and by external cooling. The by-product in both steps is a hydrochloride salt appearing as the hydrochloride salt of the hydrogen chloride acceptor. Following the reaction, the desired product can be separated in accordance with the conventional procedures described for the first preparation procedure above.

In a second alternative procedure applicable to those products wherein both of R and R′ represent a heteroaromatic amido group identical with the imidazolyl moiety in the general formula, PSCl₃ is reacted in the presence of a hydrogen chloride acceptor with an imidazole compound, as previously defined, to obtain the product of the formula:

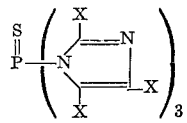

The hydrogen chloride acceptor can be any tertiary organic amine, or the imidazole compound can be employed both as reactant and as hydrogen chloride acceptor. The reaction takes place readily as temperatures of from 0° to 60° C. with the production of the desired product and hydrochloride salt of reaction, which salt ordinarily appears as the hydrochloride salt of the hydrogen chloride acceptor. Upon completion of the reaction, the desired product is separated by the conventional procedures previously defined.

In all preparation procedures hereinabove discussed, the imidazolyl moiety is introduced by reaction of a phosphorus-containing compound, as variously defined, with an imidazole compound, as defined. Similarly, in the instance wherein R′ is a heteroaromatic amido radical, such moiety is introduced by reaction of a phosphorus-containing compound with a reactant of the formula HR″ where R″ is heteroaromatic amido, that is, a reactant of the formula: heteroaromatic amido-H. In the instance of each of the imidazole compound and the heteroaromatic amido-H reactant, such compound ordinarily occurs as a tautomeric form in which no hydrogen is fixably positioned at any given ring-nitrogen atom. Accordingly, in the reaction of certain of these reactants in the methods hereinabove presented, isomeric products are produced. The products can be separated by such conventional separation procedures as chromatographic separation and fractional crystallization.

DESCRIPTION OF THE PREFERRED EMBODIMENTS

The following examples illustrate the best methods now known for the practice of the present invention and will enable those skilled in the art to practice the invention.

Example 1.—P-imidazol-1-yl-N,N,N′-trimethyl-N′-phenyl phosphonothioic diamide

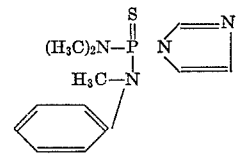

Dimethylphosphoramidothioic dichloride (85.0 grams; 0.475 mole) and N-methylaniline (107.0 grams; 1.0 mole) were mixed in 50 milliliters of benzene and the mixture heated to a temperature of about 100° C. and held there with stirring for about eighteen hours. The mixture then was cooled to room temperature and 500 milliliters of benzene added to the mixture. Thereafter, the mixture was filtered to separate the N-methylaniline hydrochloride and the filtered by-product washed with two 250-milliter portions of benzene.

The filtrate and wash were combined, containing in combination approximately 0.5 mole of N,N,N′-trimethyl-N′-phenylphosphorodiamidothioic chloride, and imidazole (68.0 grams; 1.0 mole) added to the combined filtrate and wash at a temperature of 23° C. over a period of four hours. Thereafter, the reaction mixture was held with stirring at room temperature for fifteen hours and concentrated by evaporation of benzene under subatmospheric pressure. The concentrated reaction mixture was diluted with 500 milliliters of benzene, the diluted mixture filtered to separate imidazole hydrochloride by-product and the by-product salt washed with 250 milliliters of benzene. The filtrate and wash were combined and concentrated by distillation under reduced pressure to yield the desired P-imidazol-1-yl-N,N,N′-trimethyl-N′-phenyl phosphonothioic diamide product. The product, an oil, was obtained in an 84 percent yield.

Example 2.—Imidazol-1-yldiphenyl phosphine sulfide

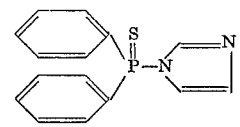

Diphenylphosphinothioic chloride (126.3 grams; 0.5 mole) was mixed with one liter of benzene. 68 grams of imidazole (1.0 mole) were added portionwise to the resulting mixture over a four and one-half hour period. The addition was carried out with the reaction mixture at a temperature of 25°–28° C. After the completion of the addition, the reaction mixture was stirred for twelve hours at a temperature of 24°–26° C. Thereafter, the reaction mixture was filtered, the imidazole hydrochloride washed with three 250-milliliter portions of benzene and the filtrate and wash liquid combined and concentrated to obtain the desired imidazol-1-yldiphenyl phosphine sulfide product. The product was obtained in a yield of 89.5 percent and was found to have a melting range of 98°–103° C.

Example 3.—Imidazol-1-yldipiperidino phosphine sulfide

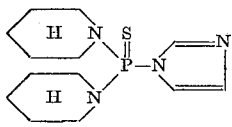

Dipiperidinophosphinothioic chloride (67.0 grams; 0.25 mole) and imidazole (34.0 grams; 0.5 mole) were reacted in essentially the same manner as the reactants of Example 2. The imidazol-1-yldipiperidino phosphine sulfide product melted at 76°–78° C.

Example 4.—2-imidazol-1-yl-1,3-dimethyl-1,3,2-diazaphospholidine-2-sulfide

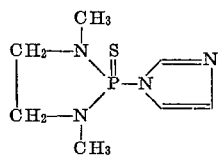

2-chloro-1,3-dimethyl - 1,3,2 - diazophospholidine-2-sulfide (92.5 grams; 0.5 mole) and triethylamine (70 milliliters; 0.5 mole) were mixed with 250 milliliters of benzene. To the resulting mixture there was added portionwise over a period of one hour 34 grams of imidazole (0.5 mole). The addition was carried out with stirring at room temperature. After the completion of the addition, the reaction mixture was held for fourteen hours with stirring at a temperature of 55°–60° C. Thereafter, the reaction mixture was diluted with 250 milliliters of benzene at room temperature, the diluted reaction mixture filtered to separate triethylamine hydrochloride which was thereafter washed with 250 milliliters of benzene and the filtrate and wash liquid combined. Benzene was removed from the combined filtrate and wash liquid by evaporation under subatmospheric pressure to obtain the desired 2-imidazol-1-yl-1,3-dimethyl-1,3,2-diazaphospholidine-2-sulfide product as a residue. The product residue was purified by recrystallization from cyclohexane to obtain a purified product melting at 52° C.

Example 5.—Triimidazol-1-yl phosphine sulfide

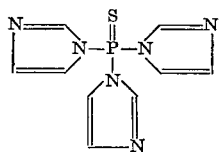

Imidazole (102.0 grams; 1.5 moles) and triethylamine (210.0 milliliters; 1.5 moles) were dispersed in 1500 milliliters of benzene to prepare a first mixture. Also, $PSCl_3$ (52.0 milliliters; 0.5 mole) was dispersed in 100 milliliters of benzene to prepare a second mixture. The first mixture was cooled to a temperature of 0°–5° C. and the second mixture was added with stirring to the first mixture at 0°–5° C. The addition was carried out over a period of five hours. After complete addition, the slurry was stirred at room temperature for about twelve hours. Thereafter, the reaction mixture was heated to reflux temperature, the insoluble triethylamine hydrochloride was filtered hot and the salt washed with 500 milliliters hot benzene. The filtrate and wash liquor were combined, cooled to a temperature of about 0° C. and held at a temperature of 0° C. for a period of about four hours during which period the desired triimidazol-1-ylphosphine sulfide product appeared as a crystalline solid in the liquid. Thereafter, the product was filtered and dried. The product melted at 145°–147° C. Yield=70.3 percent.

Other representative products of the present invention include the following:

| Name of product | Identifying property |
|---|---|
| P-imidazol-1-yl-N,N-dimethyl-P-phenyl phosphinothioic amide. | Oil. |
| P-imidazol-1-yl-N-n-butyl-N-methyl-P-phenyl phosphinothioic amide. | Oil. |
| P-(2-ethylimidazol-1-yl)-N,N-di-sec-butyl-P-phenyl phosphinothioic amide. | M.W. 363.5. |
| P-imidazol-1-yl-N-methyl-N,P-diphenyl phosphinothioic amide. | Oil. |
| P-imidazol-1-yl-N-benzyl-N-methyl-P-phenyl phosphinothioic amide. | Oil. |
| (2,-methyl-4,5-di-n-propylimidazol-1-yl)-morpholinostyryl phosphine sulfide. | M.W. 417.6. |
| P-imidazol-1-yl-N-methyl-N-($\alpha$-methyl-phenethyl)-P-phenyl phosphinothioic amide. | Oil. |
| P-imidazol-1-yl-N-furfuryl-N-methyl-P-phenyl phosphinothioic amide. | Oil. |
| (4,5-di-n-butylimidazol-1-yl)di-1-pyrrolidinyl phosphine sulfide. | M.W. 382.6. |
| P-imidazol-1-yl-N-(tetrahydrofurfuryl)-N-methyl-P-phenyl phosphinothioic amide. | Oil. |
| P-imidazol-1-yl-N-(4-pyridylmethyl)-N-methyl-P-phenyl phosphinothioic amide. | M.P. 83°–88° C. |
| P-imidazol-1-yl-N,N-diethyl-P-phenyl phosphinothioic amide. | M.P. 42°–43° C. |
| P-(4,5-diphenylimidazol-1-yl)-N-isopropyl-N-methyl-P-1,2,4-triazol-1-yl phosphinothioic amide. | M.W. 422.5. |
| P-imidazol-1-yl-N,N-dibenzyl-P-phenyl phosphinothioic amide. | M.P. 93°–99° C. |
| P-imidazol-1-yl-N,N-di-n-propyl-P-phenyl phosphinothioic amide. | Oil. |
| P-(2-phenyl-4(and 5)-methylimidazol-1-yl)-N-ethyl-N-(tetrahydrofurfuryl)-P-styryl phosphinothioic amide. | M.W. 451.6. |
| P-imidazol-1-yl-N,N-di-n-butyl-P-phenyl phosphinothioic amide. | Oil. |
| P-imidazol-1-yl-N,N-dimethyl-P-styryl phosphinothioic amide. | Oil. |
| P-imidazol-1-yl-N,N-diethyl-P-styryl phosphinothioic amide. | Oil. |
| P-(2-methyl-4(and 5)-phenylimidazol-1-yl)-N-methyl-N-(p-methylbenzyl)-P-(3,5-di-n-propyl-pyrazol-1-yl) phosphinothioic amide. | M.W. 505.7. |
| P-imidazol-1-yl-N,N-diethyl-P-phenyl phosphinothioic amide. | Oil. |
| P-(2-methylimidazol-1-yl)-N,N-diethyl-P-phenyl phosphinothioic amide. | M.P. 73°–76° C. |
| P-(2-phenylimidazol-1-yl)-N-($\alpha$-methyl-benzyl)-N-n-propyl-P-phenyl phosphinothioic amide. | M.W. 445.6. |
| P-(2-ethyl-4(and 5)-methylimidazol-1-yl)-N,N-diethyl-P-phenyl phosphinothioic amide. | M.P. 115°–118° C. |
| P-imidazol-1-yl-N,N-dimethyl-P-piperidino phosphinothioic amide. | M.P. 36°–39° C. |
| P-imidazol-1-yl-N,N-dimethyl-P-morpholino phosphinothioic amide. | Oil. |
| P-(2-sec-butylimidazol-1-yl)-N-ethyl-N-3,5-xylyl-P-(1,2,3,6-tetrahydro-1-pyridyl) phosphinothioic amide. | M.W. 416.6. |
| P-imidazol-1-yl-N,N-diethyl-P-piperidino phosphinothioic amide. | M.P. 48°–49° C. |
| P-imidazol-1-yl-N,N-diethyl-P-morpholino phosphinothioic amide. | M.P. 74°–75° C. |
| Imidazol-1-yl(4-tert-butyl-1,2,3-triazol-1-yl)pyrazol-1-yl phosphine sulfide. | M.W. 321.4. |
| P-imidazol-1-yl-N-n-butyl-N-methyl-P-piperidino phosphinothioic amide. | Oil. |
| P-imidazol-1-yl-N-n-butyl-N-methyl-P-morpholino phosphinothioic amide. | Oil. |
| P-(2-methylimidazol-1-yl)-N,N'-bis-(p-tert-butyl-phenyl)-N,N'-diisopropyl phosphonothioic diamide. | M.W. 524.8. |
| P-imidazol-1-yl-N-methyl-N-phenyl-P-morpholino phosphinothioic amide. | Oil. |
| P-imidazol-1-yl-N-benzyl-N-methyl-P-piperidino phosphinothioic amide. | M.P. 74°–76° C. |
| P-imidazol-1-yl-N-(p-ethylbenzyl)-N-phenyl-P-thiomorpholino phosphinothioic amide. | M.W. 442.6. |
| P-imidazol-1-yl-N-benzyl-N-methyl-P-morpholino phosphinothioic amide. | Oil. |
| Imidazol-1-ylmorpholinopiperidino phosphine sulfide. | Oil. |
| Imidazol-1-yldimorpholino phosphine sulfide. | M.P. 114°–115° C. |
| P-imidazol-1-yl-N-ethyl-N-isobutyl-N'-phenyl-N'-furfuryl phosphonothioic diamide. | M.W. 402.5. |
| Imidazol-1-ylphenylpiperidino phosphine sulfide. | M.P. 25° C. |
| Imidazol-1-ylphenylmorpholino phosphine sulfide. | Oil. |
| P-imidazol-1-yl-N,N-dimethyl-P-(4-methyl-1-piperazinyl) phosphinothioic amide. | M.P. 87°–90° C. |
| P-imidazol-1-yl-N,N-diethyl-P-(4-methyl-1-piperazinyl) phosphinothioic amide. | Oil. |
| P-imidazol-1-yl-N-benzyl-N-methyl-P-(4-methyl-1-piperazinyl) phosphinothioic amide. | M.P. 73°–77° C. |
| P-(4(and 5)-phenylimidazol-1-yl)-N-(tetrahydrofurfuryl)-N-2,4-xylyl-P-piperidino phosphinothioic amide. | M.W. 493.7. |
| Imidazol-1-ylphenyl(4-methyl-1-piperazinyl) phosphine sulfide. | M.P. 104°–109° C. |
| Imidazol-1-yl(4-methyl-1-piperazinyl)-piperidino phosphine sulfide. | Oil. |
| P-(2-methylimidazol-1-yl)-N-benzyl-N-o-tolyl-P-(4-n-propyl-1-piperazinyl) phosphinothioic amide. | M.W. 467.6. |
| Imidazol-1-yl(4-methyl-1-piperazinyl)-morpholino phosphine sulfide. | Oil. |
| Imidazol-1-ylphenyl(4-phenyl-1-piperazinyl) phosphine sulfide. | M.P. 126°–127° C. |

| Name of product | Identifying property |
| --- | --- |
| P-imidazol-1-yl-N,N-diethyl-P-(4-acetyl-1-piperazinyl) phosphinothioic amide. | M.P. 112°–114° C. |
| Diimidazol-1-yl(5-phenyltetrazol-2-yl) phosphine sulfide. | M.W. 342.3. |
| Diimidazol-1-ylphenyl phosphine sulfide. | M.P. 75°–78°C. |
| P,P-diimidazol-1-yl-N,N-dimethyl phosphinothioic amide. | Oil. |
| P-(2-methylimidazol-1-yl)-N,N-difurfuryl-P-1,2,3-triazol-1-yl phosphinothioic amide. | M.W. 388.4. |
| P,P-diimidazol-1-yl-N,N-diethyl phosphinothioic amide. | M.P. 39°–42°C. |
| P,P-diimidazol-1-yl-N-n-butyl-N-methyl phosphinothioic amide. | Oil. |
| P,P-diimidazol-1-yl-N-methyl-N-phenyl phosphinothioic amide. | M.P. 75°–86° C. |
| P-(2-ethylimidazol-1-yl)-N-methyl-N-phenyl-P-1,2,4-triazol-1(and 2)-yl phosphinothioic amide. | M.W. 332.4. |
| P,P-diimidazol-1-yl-N-benzyl-N-methyl phosphinothioic amide. | M.P. 54°–55° C. |
| P,P-diimidazol-1-yl-N,N-dibenzyl phosphinothioic amide. | Gum. |
| P-imidazol-1-yl-N,N-bis(tetrahydrofurfuryl)-P-tetrazol-1-yl phosphinothioic amide. | M.W. 383.4. |
| Diimidazol-1-ylstyryl phosphine sulfide. | M.W. 300.3. |
| Diimidazol-1-ylpiperidino phosphine sulfide. | Oil. |
| Diimidazol-1-ylmorpholino phosphine sulfide. | M.P. 86°–89° C. |
| P-imidazol-1-yl-N,N-bis(4-pyridylmethyl)-P-(3,4,5-trimethylpyrazol-1-yl) phosphinothioic amide. | M.W. 437.5. |
| Diimidazol-1-yl(4-methyl-1-piperazinyl) phosphine sulfide. | M.P. 95°–99° C. |
| Diimidazol-1-yl(4-acetyl-1-piperazinyl) phosphine sulfide. | M.W. 324.4. |
| Imidazol-1-ylbis(3(and 5)-n-butyl-pyrazol-1-yl) phosphine sulfide. | M.W. 376.5. |
| P-imidazol-1-yl-N,N-diethyl-N'-methyl-N'-phenyl phosphonothioic diamide. | Oil. |
| P-imidazol-1-yl-N,N-diethyl-N'-benzyl-N'-methyl phosphonothioic diamide. | M.P. 47°–49° C. |
| P-imidazol-1-yl-N,N-diethyl-N'-methyl-N'-furfuryl phosphonothioic diamide. | Oil. |
| (2-phenylimidazol-1-yl)(3,4-diphenyl-pyrazol-1-yl)-thiomorpholino phosphine sulfide. | M.W. 527.7. |
| P-imidazol-1-yl-N,N'-dimethyl phosphonothioic diamide. | Oil. |
| P-ipidazol-1-yl-N-benzyl-N'-phenyl-N,N'-dimethyl phosphonothioic diamide. | Oil. |
| Imidazol-1-ylpyrazol-1-yl(3,5-dimethyl-1,2,4-triazol-1-yl) phosphine sulfide. | M.W. 293.3. |
| P-imidazol-1-yl-N-benzyl-N,N',N'-trimethyl phosphonothioic diamide. | Oil. |
| P-imidazol-1-yl-N,N,N',N'-tetrabenzyl phosphonothioic diamide. | M.P. 175°–176° C. |
| P-imidazol-1-yl-N,N'-dibenzyl-N,N'-diisopropyl phosphonothioic diamide. | M.P. 144°–151° C. |
| Bis(2-methylimidazol-1-yl)(4-tert-butyl-1,2,3-triazol-1-yl) phosphine sulfide. | M.W. 349.4. |
| 2-imidazol-1-yl-1,3-dibenzyl-1,3,2-diazaphospholidine-2-sulfide. | Oil. |
| 2-imidazol-1-yl-1,3-diphenyl-1,3,2-diazaphospholidine-2-sulfide. | M.W. 340.4. |
| Imidazol-1-ylphenyl(1,2,3,6-tetrahydro-1-pyridyl) phosphine sulfide. | Oil. |
| Imidazol-1-yl-N-benzyl-N-furfuryl-P-(5-isobutyl-tetrazol-2-yl) phosphinothioic amide. | M.W. 441.5. |
| P-imidazol-1-yl-N,N'-dimethyl-P-(1,2,3,6-tetrahydro-1-pyridyl)phosphiothioic amide. | Liquid. |
| P-imidazol-1-yl-N,N-diethyl-P-(1,2,3,6-tetrahydro-1-pyridyl) phosphinothioic amide. | Do. |
| Imidazol-1-yltetrazol-1-yl(5-phenyl-tetrazol-2-yl) phosphine sulfide. | M.W. 344.3. |
| P-imidazol-1-yl-N-benzyl-N-methyl-P-(1,2,3,6-tetrahydro-1-pyridyl) phosphinothioic amide. | Oil. |
| P-imidazol-1-yl-N,N-dibenzyl-P-morpholino phosphinothioic amide. | M.P. 84°–89° C. |
| P-imidazol-1-yl-N,N-dibenzyl-P-(1,2,3,6-tetrahydro-1-pyridyl) phosphinothioic amide. | Oil. |
| P-imidazol-1-yl-N,N-dibenzyl-P-1-pyrrolidin-1-yl phosphinothioic amide. | Oil. |
| P-imidazol-1-yl-N-benzyl-N-methyl-P-1-pyrrolidinyl phosphinothioic amide. | Oil. |
| 2-imidazol-1-yl-1,3-di-n-propyl-1,3-dihydro-1,3,2-benzodiazaphospholidine-2-sulfide. | M.W. 320.4. |
| 2-(4,5-diphenylimidazol-1-yl)-1,3-di-benzylhexahydro-1,3,2-diazaphospholidine-2-sulfide. | M.W. 534.7. |
| Imidazol-1-yldi-1-pyrrolidinyl phosphine sulfide. | Liquid. |
| Imidazol-1-yldipiperidino phosphine sulfide. | Do. |
| Imidazol-1-yl-1-pyrrolidinyl(1,2,3,6-tetrahydro-1-pyridyl) phosphine sulfide. | Oil. |
| Imidazol-1-ylbis(4-methyl-1-piperazinyl) phosphine sulfide. | Oil. |
| 2-imidazol-1-methyl-3-phenyl-1,3,2-diazaphospholidine-2-sulfide. | M.W. 278.3. |
| P-imidazol-1-yl-N,N-dibenzyl-P-piperidine phosphinothioic amide. | Oil. |
| P-imidazol-1-yl-N,N-dibenzyl-P-(4-methyl-1-piperazinyl) phosphinothioic amide. | Oil. |
| P-imidazol-1-yl-N,n-butyl-N-methyl-P-styryl phosphinothioic amide. | Oil. |
| P-imidazol-1-yl-N,N'-dimethyl-N,N'-diphenyl phosphonothioic diamide. | Oil. |
| P-imidazol-1-yl-N,N-dibenzyl-N',N'-dimethyl phosphonothioic diamide. | M.P. 69°–74° C. |
| P-imidazol-1-yl-N-methyl-N,N',N'-tribenzyl phosphonothioic diamide. | M.W. 446.6. |
| P-imidazol-1-yl-N,N-diethyl-N'-methyl-N'-(4-pyridylmethyl) phosphonothioic diamide. | Oil. |
| P,P-diimidazol-1-yl-N,N-di-n-butyl phosphinothioic amide. | M.P. 42°–45° C. |
| P,P-diimidazol-1-yl-N-furfuryl-N-methyl phosphinothioic amide. | Oil. |
| Diimidazol-1-yl (1,2,3,6-tetrahydro-1-pyridyl) phosphine sulfide. | Oil. |
| P-imidazol-1-yl-N,N-dimethyl-P-pyrazol-1-yl phosphinothioic amide. | Oil. |

In the above table, the symbol "M.P." is used as an abbreviation of the term "melting point," and the symbol "M.W." as an abbreviation of the term "molecular weight."

It has been discovered that the present imidazolyl phosphorus compounds are particularly adapted to be employed for the control of a wide range of fungi, especially those fungal organisms ordinarily found on the aerial portions of plants such as, for example, cherry leaf spot, apple scab, rice blast, powdery mildew, Helminthosporium (leaf spot on grasses, cereals and corn) and late blight. The compounds can also be applied in dormant applications to the woody surfaces of plants or to orchard floor surfaces for the control of the over-wintering spores of many fungi. In addition, the imidazolyl phosphorus compounds can be applied to seeds to protect the seeds from the attack of fungal organisms such as rot and mildew. Also, the imidazolyl phosphorus compounds can be distributed in soil at fungicidal concentrations to control the organisms which attack seeds and plant roots, particularly the fungal organisms of root rot and mildew.

In further operations, the compounds can be included in inks, adhesives, soaps, cutting oils, polymeric materials or in oil or latex paints to prevent mold, mildew and the degradation of such products resulting from microbial attack. Also, the compounds can be distributed in textile or cellulosic materials, or can be employed in the impregnation of wood and lumber to preserve and protect such products from the attack of the microbial agents of rot, mold, mildew and decay. The foregoing environments are merely illustrative of the many habitats in which these agents can be distributed to obtain excellent fungal control.

In the fungicidal application of the imidazolyl phosphorus compounds, the unmodified materials can be employed. However, compounds can also be employed together with a parasiticidal adjuvant to obtain a liquid, powder or dust composition containing one or more of the compounds. Such compositions are adapted to be applied to the living plants without substantial injury to the plants. In preparing toxicant compositions, the imidazolyl phosphorus compounds can be modified with one or more of a plurality of additaments including organic solvents, petroleum distillates, water or other liquid carriers, surface active dispersing agents and finely divided inert solids. In such compositions, the imidazolyl phosphorus compounds oftentimes are present in a concentration from about 2 to 98 percent by weight. Depending upon the concentration in the composition of the imidazolyl phosphorus compound, such augmented compositions are adapted to be employed for the control of the undesirable fungi or employed as concentrates and subsequently diluted with additional inert carrier to produce the ultimate treating compositions. In compositions where the adjuvant or helper is a finely divided solid, a surface active agent, or the combination of a surface active agent and a liquid additament, the carrier cooperates with the active component so as to facilitate the invention and to obtain an improved and outstanding result.

The exact concentration of the imidazolyl phosphorus compound employed in the compositions for application to the fungal organism and/or its habitat can vary provided a fungicidal dosage of toxicant is applied either on the organism or its environment. This dosage of toxicant is primarily dependent upon the susceptibility of the particular organism to the particular imidazolyl phosphorus compound employed. In general, good results are obtained with liquid compositions containing from about 0.0001 to 2.0 percent by weight of toxicant; in some operations, however, compositions containing as much as from 2 to 98 percent by weight are conveniently employed as, for example, in applications to orchard floor surfaces for the control of spores. With dusts, good results are usually obtained with compositions containing from 0.001 to 2.0 percent or more by weight of toxicant. In some circumstances, it is preferred to employ dust compositions containing as much as from 2 to 98 percent or more by weight of toxicant. Where the compositions are to be applied to living plants, it is preferred that the toxicant be present in an amount not to exceed about 0.8 percent in liquid compositions and 1.0 percent in dusts. In terms of acreage application, good controls of fungal organisms are obtained when the imidazoyl phosphorus compounds are applied to plots of growing plants at a dosage of from 0.004 to 3 or more pounds per acre.

PREPARATION OF STARTING MATERIALS

The phosphorothioic chloride compounds employed as starting materials in the preparation of the products of the present invention are prepared by known procedures. For example, in the instance wherein each of R and R' is taken separately and R represents diloweralkylamido and R' represents heteroparaffinic amido, heteroaromatic amido or

PSCl₃ is reacted successively in either order or simultaneously with a compound of the formula diloweralkylamido-H and with a compound of the formula R"H, wherein R" represents heteroparaffinic amido, heteroaromatic amido or

When both of R and R' represent the same or different heteroparaffinic amido, heteroaromatic amido or

groups, PSCl₃ is reacted successively in either order or simultaneously with one or more reactants of the R"H formula only. It is preferable to carry out either type of reaction in an inert liquid reaction medium and in the presence of a hydrogen chloride acceptor. Preferably, the hydrogen chloride acceptor is the same compound as the R"H or diloweralkylamido-H reactant. Good results are obtained when employing the reactants in amounts which represent equimolecular proportions of PSCl₃, of each reactant from which it is desired to introduce one R or R' group into the ultimate phosphorothioic chloride starting material, and of hydrogen chloride acceptor. When both groups to be introduced are the same, good results are obtained when employing two molecular proportions of the reactant from which the group is derived, two molecular proportions of the hydrogen chloride acceptor and one molecular proportion of PSCl₃.

Those of the starting phosphorothioic chloride compounds wherein R and R' are taken together are prepared by a modification of this procedure. In this modification, a diamine compound of the formula

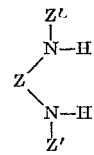

is reacted with PSCl₃. Good results are obtained when employing one equimolecular proportion of diamine compound, one molecular proportion of PSCL₃ and two molecular proportions of hydrogen chloride acceptor. In all other respects, the reaction is carried out as hereinabove set forth.

In the preparation of those starting products wherein each of R and R' represents phenyl or styryl, an aromatic compound of the formula Ar—H wherein Ar represents phenyl or styryl is reacted with aluminum chloride and phosphorus trichloride (PCl₃) at temperatures of from 50° to 280° C. to prepare a diaryl phosphorus chloride product of the formula Ar₂PCl and PCl₃ by-product. Good results are obtained when employing the reactants in amounts which represent one molecular proportion of aromatic compound, 1.3 molecular proportions of aluminum chloride and 4 molecular proportions of phosphorus trichloride. The PCl₃ is separated in conventional procedures and the diaryl phosphorus chloride reacted with an excess of PSCl₃ at temperatures of from 50° to 150° C. to prepare the desired starting product of the formula:

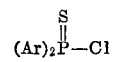

Starting products wherein one of R and R' represents phenyl or styryl and the other represents diloweralkylamido, heteroparaffinic amido, heteroaromatic amido or

are prepared by reacting an aryl phosphorus dichloride product of the formula

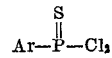

with a compound of the formula

R'''H wherein R''' represents diloweralkylamido, heteroparaffinic amido, heteroaromatic amido or

The reaction is carried out in the presence of an inert liquid reaction medium and in the presence of a hydrogen chloride acceptor such as an organic tertiary amine. Good results are obtained when employing equimolecular proportions of aryl phosphorus dichloride product, R"H compound and hydrogen chloride acceptor.

The raw materials required for the preparation of starting products, which raw materials have the formulae

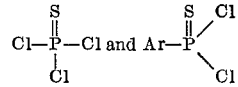

are conveniently available or can be manufactured as described by J. R. van Wazer in "Phosphorus and Its Compounds," volume I, pages 245 and 258 (1958), Inter-Science Publishers, New York, N.Y., and by K. Sasse in "Methoden der Organischen Chemie," volume XII—part i, "Organische Phosphorverbindungen," pages 387–406, 552–557 (1963), Thieme Verlag, Stuttgart, Germany.

The present application is directed to and concerned with the disclosure and claiming of the invention as described hereinbefore. The present application is also directed to the disclosure and claiming of the invention in compounds, methods or compositions comprising or employing any subgeneric group or class of imidazolyl phosphorus compounds which may be obtained by any permutation or combination of the alternative expressions in the several compound definitions to be found hereinbefore.

What is claimed is:

1. Compound of the formula

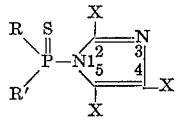

wherein each X substituent independently represents hydrogen, loweralkyl or phenyl, the total number of carbon atoms in all X substituents being an integer of from 0 to 15, both inclusive; and (A) each of R and R' being taken separately, R represents
  (1) diloweralkylamido
  (2) heteroparaffinic amido radical selected from the group consisting of morpholino, thiomorpholino, piperidino, 1-pyrrolidinyl, 4-substituted-1-piperazinyl wherein the substituent is loweralkyl, phenyl, or acetyl, and 1,2,3,6-tetrahydro-1-pyridyl, or
  (3) heteroaromatic amido radical of the formula

wherein Q represents a group which the nitrogen atom completes an aromatic ring which (a) has five ring atoms, of which ring atoms at least two are nitrogen and one is carbon, each of the two remaining ring atoms being selected from the group consisting of carbon and nitrogen and of which (b) each ring carbon atom bears a substituent which is selected from the group consisting of hydrogen, loweralkyl, and phenyl, the total number of carbon atoms in all substituents on all ring carbon atoms of the aromatic ring being an integer of from 0 to 15, both inclusive, and (4)

G being a member selected from the group consisting of loweralkyl and G''; G' being a member selected from the group consisting of phenyl, loweralkylphenyl and G''; and G'' being a member selected from the group consisting of phenyl-loweralkyl, (loweralkylphenyl)loweralkyl, furfuryl, tetrahydrofurfuryl and (4-pyridylmethyl); and (B) each R' independently represents phenyl or styryl.

2. The compound of claim 1 wherein R represents diethylamido, R' represents phenyl and each X represents hydrogen, corresponding to P-imidazol-1-yl-N,N-diethyl-P-phenyl phosphinothioic amide.

3. The compound of claim 1 wherein R represents dimethylamido, R' represents phenyl and each X represents hydrogen, corresponding to P-imidazol-1-yl-N,N-dimethyl-P-phenyl phosphinothioic amide.

4. The compound of claim 1 wherein R represents dimethylamido, R' represents styryl and each X represents hydrogen, corresponding to P-imidazolyl-P-styryl-N,N-dimethyl phosphinothioic amide.

5. The compound of claim 1 wherein R represents piperidino, R' represents phenyl and each X represents hydrogen, corresponding to imidazol-1-ylphenylpiperidino phosphine sulfide.

References Cited

UNITED STATES PATENTS

| | | | |
|---|---|---|---|
| 3,111,526 | 11/1963 | Koopmans et al. | 260—309.2 |
| 3,150,149 | 9/1964 | Uhlenbroek et al. | 260—310 |
| 3,359,276 | 12/1967 | Nielsen et al. | 260—309 |

OTHER REFERENCES

Greenley et al.: J. Org. Chem. 29, 1009–13 (1964).

HENRY R. JILES, Primary Examiner

G. T. TODD, Assistant Examiner

U.S. Cl. X.R.

260—243, 247.1, 268, 293.4, 294.8, 308, 309, 310; 424—200